United States Patent [19]

Milatz et al.

[11] 4,344,685

[45] Aug. 17, 1982

[54] PHOTOGRAPHIC CAMERAS

[75] Inventors: Erhard Milatz, Langenfeld; Hans Schmidt, Monheim, both of Fed. Rep. of Germany

[73] Assignee: Robot Foto & Electronic GmbH & Co. K.G., Dusseldorf, Fed. Rep. of Germany

[21] Appl. No.: 75,740

[22] Filed: Sep. 14, 1979

[30] Foreign Application Priority Data

Sep. 14, 1978 [DE] Fed. Rep. of Germany ....... 2839910

[51] Int. Cl.³ ................... G03B 1/12; G03B 17/00; G03B 1/00; G03B 17/02
[52] U.S. Cl. ................... 354/173; 354/203; 354/212; 354/288
[58] Field of Search ............. 354/173, 203, 212–214, 354/275, 288

[56] References Cited

U.S. PATENT DOCUMENTS

| | | | |
|---|---|---|---|
| 2,378,406 | 6/1945 | Harris | 354/212 |
| 2,927,518 | 3/1960 | Dörr | 354/214 |
| 2,969,722 | 1/1961 | Schwartz | 354/173 |
| 3,474,714 | 10/1969 | Bihlmaier et al. | 354/214 |

FOREIGN PATENT DOCUMENTS

| | | | |
|---|---|---|---|
| 199491 | 9/1958 | Austria | 354/173 |
| 203841 | 6/1959 | Austria | 354/173 |
| 1104822 | 4/1961 | Fed. Rep. of Germany | 354/173 |

*Primary Examiner*—Donald A. Griffin
*Attorney, Agent, or Firm*—Howard H. Darbo

[57] ABSTRACT

The invention relates to a photographic camera of high quality and extremely small dimensions. To this end the camera objective and the film track are provided on the front and rear faces, respectively, of a generally block-shaped central housing body. An upper housing portion extends on both sides laterally beyond the central housing body and carries, on its projecting parts, the film drive motor and a battery. A lower housing portion defines chamber members on both sides of the central housing body. These chamber members are open at the top and are interconnected by a rear wall and a bottom plate to define a space therebetween which accommodates the central housing body. The take-up and supply spools are located in the chamber members and, in turn, accommodate the film drive motor and battery, respectively, which project downwards from the upper housing portion.

6 Claims, 4 Drawing Figures

PHOTOGRAPHIC CAMERAS

BACKGROUND AND SUMMARY OF THE INVENTION

The invention relates to a photographic camera comprising:

a supply spool and a take-up spool, a film track and a film engaging plate between said spools, a camera objective, which is arranged to produce a real image in the plane of the film track, a film driving motor which is coupled to the take-up spool, an electronic control device, and a battery arranged to supply energy to the film driving motor and to the electronic control device.

It is the object of the invention to provide a camera of high quality which has extremely small dimensions and may, in particular, be used for observation purposes.

According to the invention, this object is achieved in that
 (a) the camera objective and the film track are provided on a generally block-shaped central housing body on opposite sides (front and rear face) thereof,
 (b) an upper housing portion is located on the upper side of the central housing body and extends on both sides beyond the central housing body,
 (c) a lower housing portion defines a chamber member of substantially rectangular cross section below each of the laterally projecting parts of the upper housing body, said chambers accommodating said supply and take-up spools, respectively, said two chamber members being open towards the top and being interconnected by a rear wall and by a bottom plate, whereby a space is defined between the chamber members and the bottom plate, into which space the central housing body is removably inserted, vertical film passage slots being provided in the chamber members along the rear wall, and the film engaging plate being mounted on the rear wall, and
 (d) the film drive motor is attached on one side to one of the projecting parts of the upper housing portion, and the battery is attached to the other one of the projecting parts on the other side of the upper housing portion, said film drive motor and said battery extending therefrom downwardly into the hollow take-up spool and supply spool, respectively, a coupling member mounted on the film drive motor being coupled directly to the take-up spool, when the central housing body is inserted.

Further modifications of the invention are subject matter of the sub-claims.

An embodiment of the invention is described hereinbelow with reference to the accompanying drawings:

DESCRIPTION OF AN EMBODIMENT OF THE INVENTION

Figure 1:
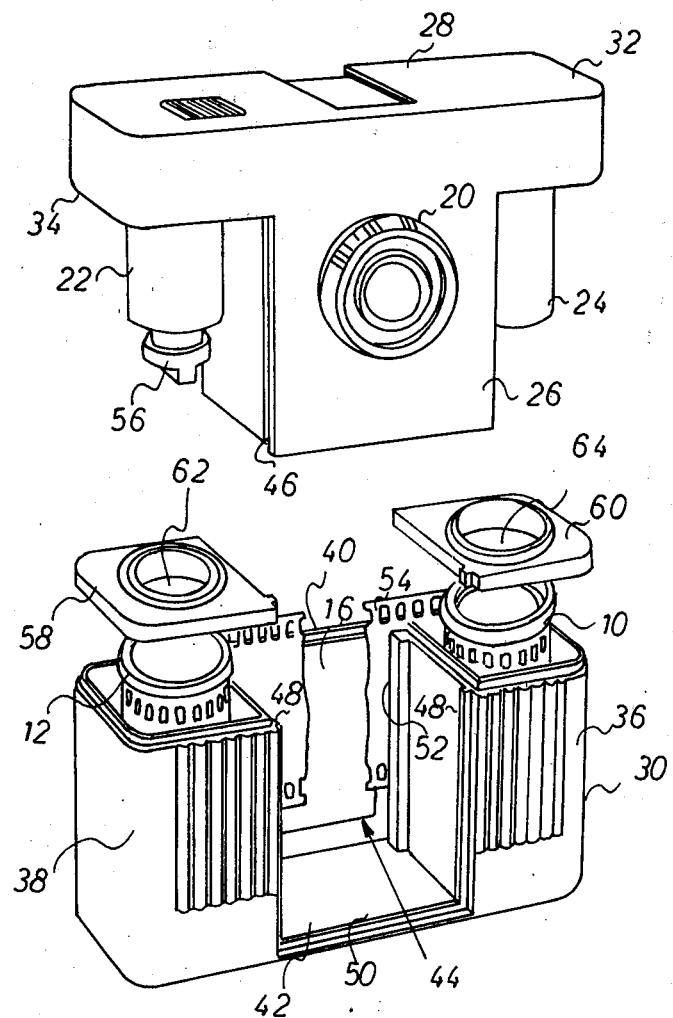
FIG. 1 is an exploded perspective view of a photographic camera constructed in accordance with the invention.
Figure 2:
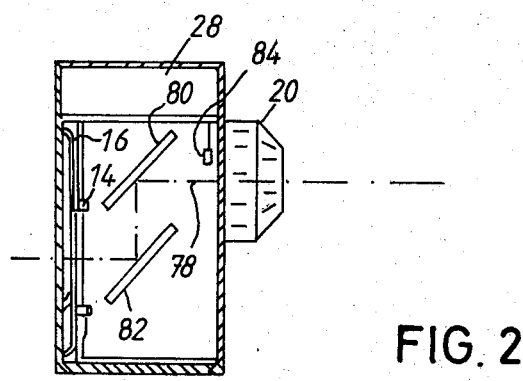
FIG. 2 is a schematic vertical sectional view of the camera with the optical path of rays.

The photographic camera comprises a supply and a take-up spool 10 and 12, respectively with a film track 14 and a film engaging plate 16 arranged therebetween, a camera objective 20, which is arranged to produce a real image in the plane of the film track 14, a film drive motor 22, which is coupled to the take-up spool 12, an electronic control device, and a battery 24 arranged to supply energy to the film drive motor 22 and to the electronic control device. The camera objective 20 and the film track 14 are provided on a generally block-shaped central housing body 26 on opposite sides (front and rear face) thereof. An upper housing portion 28 is located on the upper side of the central housing body 26 and extends on both sides laterally beyond the central housing body 26. A lower housing portion 30 defines a chamber member 36 and 38 of substantially rectangular cross section below each of the laterally projecting parts 32,34 of the upper housing portion, said chambers accommodating the supply and take-up spools 10 and 12, respectively. These two chamber members are open towards the top. They are interconnected by a rear wall 40 and a bottom plate 42, whereby a space 44 is defined between the chamber members 36,38, the rear wall 40 and the bottom plate 42, into which space the central housing body 26 is removably inserted. To this end the central housing body 26 has grooves 46 in its front face on both sides and is adapted to be slid with these grooves 46 and ledges 48 provided on the chamber members 36,38. The central housing body 26 has a similar groove extending over a ledge 50 on the front side of the bottom plate 42. Vertical film passage slots 52 are provided in the chamber members 36,38 along the rear wall 40, a film 54 passing through these slots. The film engaging plate 16 is mounted on the rear wall 40.

The film drive motor 22 is attached on one side to one of the projecting parts 34 of the upper housing portion 28, and the battery 24 is attached to the other one of the projecting parts 32 on the other side of the upper housing portion 28. Film drive motor 22 and battery 24 extend from these projecting parts 34 and 32, respectively, downwards into the hollow, sleeveshaped take-up and supply spools 12 and 10, respectively. A coupling member 56 mounted on the film drive motor is coupled directly with the take-up spool, when the central housing body 26 is inserted into the lower housing portion 30.

The chamber members 38 and 36 are closed at the top by snap-in covers 58 and 60, respectively, which have a circular aperture, 62 and 64, respectively, each therethrough permitting inserting and guiding of the film drive motor 22 and of the battery 24, respectively, and which form bearings for the upper end of the sleeveshaped take-up and supply spools 12 and 10, respectively.

Figure 3:
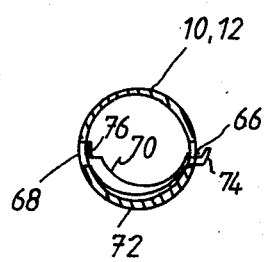
FIG. 3 is a cross sectional view of a take-up or supply spool.

As can be seen from FIG. 3, each of the two sleeveshaped spools 10 and 12 has a pair of openings 66 and 68 in its circumferential surface in a plane perpendicular to the spool axis in the area of the film perforation. An arcuate anchor body 70 is mounted for rotation between two end positions about an axis parallel to the spool axis on the inner side of the spool 10,12 between the openings 68 and 66. The anchor body 70 ends in hooks 74,76 at both ends. In one of the end positions illustrated in FIG. 3, one hook 74 extends outwards through one opening and the other, oppositely pointing hook 76 is retracted behind the wall of the spool 10 or 12, while in the other end position, said other hook 76 extends outwards and the first hook 74 is retracted. In this way each of the spools may serve optionally as take-up or supply spool. The hooks 74 and 76 are shaped such that the film may be drawn off the hook of the supply spool at the end of the film.

In order to keep the depth dimensions of the camera small, the imaging path of rays from the camera objective 20 to the film track 14 located lower than the camera objective 20 is folded by two plane mirrors 80,82, each of which is arranged at an angle of 45° with respect to the optical axis 78 of the imaging beam. This folding reduces the depth of the camera, i.e. the fron-to-rear dimension. The use of two plane mirrors 80,82 for the folding ensures that the image in the plane of the film track is produced correctly, i.e. without mirror inversion, which would occur with the use of a single mirror.

The electronic control device is arranged substantially in the upper housing portion 28. A photoelectric sensor is arranged in a pupil of the path of rays of the camera objective. The measurement of exposure in the path of rays of the camera objective is important for a a camera which is used for observation purposes, because it is often necessary to take pictures through one opening only of some camouflage and no second opening for exposure measurement is available, and in addition because the sensor might be obscured by the camouflage.

Figure 4:
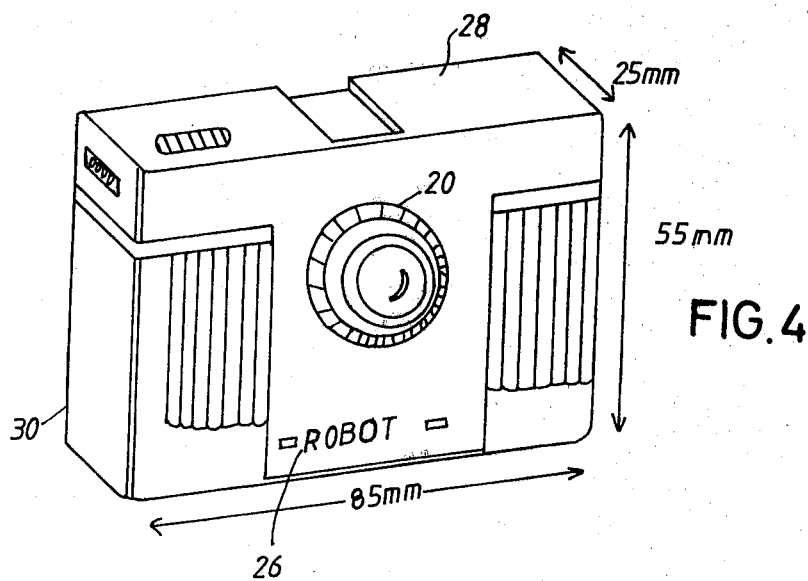
FIG. 4 is a perspective view of the camera when assembled, the dimensions given illustrating the miniaturization permitted by the construction of the invention.

As can be seen from FIG. 4, the measures of the invention provide a camera the dimensions of which are 85×55×25 millimeters.

We claim:

1. Photographic camera comprising:
   a hollow sleeve-shaped supply spool and a hollow sleeve-shaped take-up spool, a film track and a film engaging plate between said spools,
   a camera objective, which is arranged to produce a real image in the plane of the film track,
   a film driving motor which is coupled to the take-up spool,
   an electronic control device and
   a battery arranged to supply energy to the film driving motor and to the electronic control device, characterized in that
   (a) the camera objective and the film track are provided on a generally block-shaped central housing body on opposite sides (front and read face) thereof,
   (b) an upper housing portion is located on the upper side of the central housing body and extends on both sides beyond the central housing body,
   (c) a lower housing portion forms a chamber member of substantially rectangular cross section below each of the laterally projecting parts of the upper housing body, said chambers accommodating said supply and take-up spools, respectively, said two chamber members being open towards the top and being interconnected by a rear wall and by a bottom plate, whereby a space is defined between the chamber members and the bottom plate, into which space the central housing body is removably inserted, vertical film passage slots being provided in the chamber members along the rear wall, and the film engaging plate being mounted on the rear wall, and
   (d) the film drive motor is attached on one side to one of the projecting parts of the upper housing portion, and the battery is attached to the other one of the projecting parts on the other side of the upper housing portion, said film drive motor and said battery extending therefrom downwardly into the hollow take-up spool and supply spool, respectively, a coupling member mounted on the film drive motor being coupled directly to the take-up spool, when the central housing body is inserted.

2. Photographic camera as set forth in claim 1, characterized in that the chamber members are closed at the top by snap-in covers which have a circular aperture each therethrough permitting insertion and guiding of the film drive motor and of the battery, respectively, and which form bearings for the upper ends of the sleeve-shaped take-up and supply spools, respectively.

3. Photographic camera as set forth in claim 1 or 2, characterized in that
   (a) each of the two sleeve-shaped spools has a pair of openings in its circumferential surface in a plane perpendicular to the spool axis in the area of the film perforation,
   (b) an arcuate anchor body is mounted for rotation between two end positions about an axis parallel to the spool axis on the inner side of the spool between said openings, said anchor body ending in hooks at both ends,
   (c) one hook extends outwards through one opening in one of the end positions, the other, oppositely pointing hook being retracted behind the wall of the spool, while, in the other end position, said other hook extends outwards and the first hook is retracted.

4. Photographic camera as set forth in anyone of the claims 1 to 3, characterized in that the imaging path of rays from the camera objective to the film track located lower than the camera objective is folded by two plane mirrors, each of which is arranged at an angle of 45° with respect to the optical axis of the imaging beam.

5. Photographic camera as set forth in anyone of the claims 1 to 4, characterized in that the electronic control device is arranged substantially in the upper housing portion.

6. Photographic camera as set forth in anyone of the claims 1 to 5, characterized in that a photoelectric sensor for the automatic exposure control is arranged in a pupil of the path of rays of the camera objective.

* * * * *